June 16, 1942. G. A. LYON Re. 22,120

WHEEL COVER

Original Filed April 8, 1937 4 Sheets-Sheet 1

Inventor

GEORGE ALBERT LYON.

by Charles G. Fields Attys.

June 16, 1942. G. A. LYON Re. 22,120

WHEEL COVER

Original Filed April 8, 1937 4 Sheets-Sheet 2

Inventor

GEORGE ALBERT LYON.

by Charles C. Hills Attys.

June 16, 1942. G. A. LYON Re. 22,120

WHEEL COVER

Original Filed April 8, 1937 4 Sheets-Sheet 3

Inventor

GEORGE ALBERT LYON.

by Charles H. Hill Attys.

WHEEL COVER

Original Filed April 8, 1937 4 Sheets-Sheet 4

Inventor

GEORGE ALBERT LYON.

by Charles O. Hills Attys.

Reissued June 16, 1942

Re. 22,120

UNITED STATES PATENT OFFICE 22,120

WHEEL COVER

George Albert Lyon, Allenhurst, N. J.

Original No. 2,214,747, dated September 17, 1940, Serial No. 135,657, April 8, 1937. Application for reissue December 23, 1940, Serial No. 371,442

13 Claims. (Cl. 301—37)

This invention relates to a method and means for mounting a member on a wheel, and more particularly to a method and means which permits an ornamental member to be mounted on a wheel with little effort and with a relatively small force, but which requires a relatively great force to disengage the ornamental member from the wheel.

This is a continuation in part of my copending application, entitled "Means for mounting ornamental wheel accessory," Serial No. 109,251, filed November 5, 1936.

In designing ornamental members adapted to be secured on the outer side of a wheel, it is considered important to provide a construction which may quickly and easily be assembled, which will not accidentally come off due to vibration or sudden jar, and which may readily be disassembled when desired. The most desirable construction, therefore would include a mounting means which requires very little force to assemble the ornamental member on the wheel, but which requires a relatively great force to remove the ornamental member from the wheel. Furthermore, a mounting means of the above type preferably should be hidden from view in the assembled position of the ornamental member on the wheel.

It is an object of this invention to provide a novel wheel assembly possessing the above highly desirable characteristics.

Another object of this invention is to provide a novel wheel assembly including novel means for mounting an ornamental member on a wheel, which is economical to manufacture and which is rugged and reliable in use.

A further object of this invention is to provide a novel method and means of mounting an ornamental member on a wheel which requires only a relatively small force to mount the member, but which requires a relatively great force to dismount the member from the wheel.

It is also an object of this invention to provide a novel means for mounting a plurality of ornamental members on a wheel.

A still further object of this invention is to provide novel means for mounting an ornamental member on a wheel, the means being secured to an auxiliary member mounted on the front face of the wheel.

Another and further object of this invention is to provide means for mounting an ornamental member on a wheel including a plurality of leaf spring ornamental member retaining elements of a novel design, which elements operate in a novel manner to detachably secure an ornamental member to the wheel.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1:
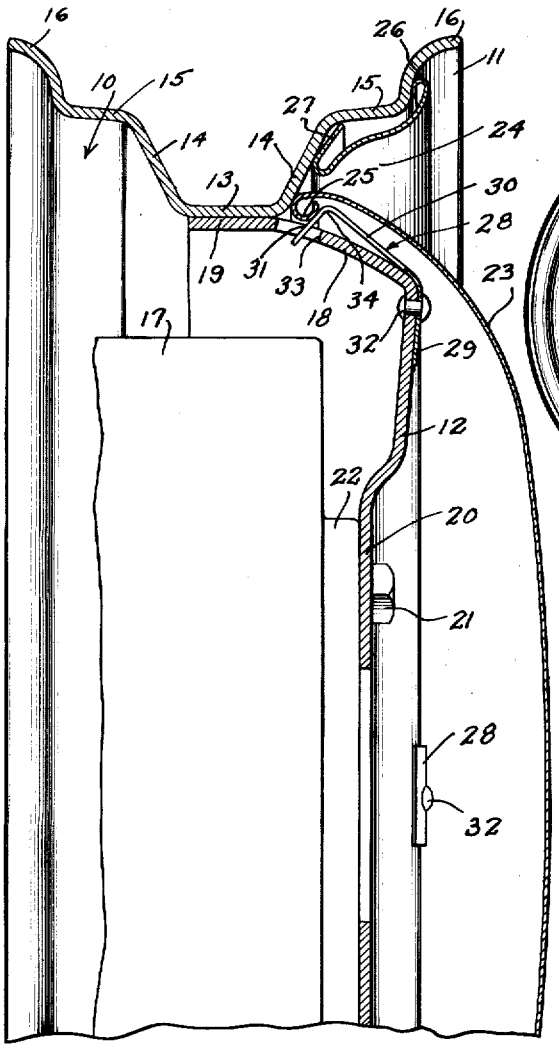
Figure 1 is an elevational view, partly in cross section, of the upper half of a wheel assembly including an ornamental member and novel means for mounting the ornamental member on the wheel.
Figure 2:
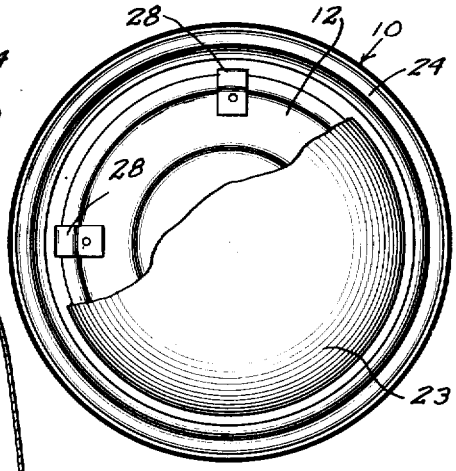
Figure 2 is a front elevational view of a wheel assembly, a portion of the ornamental member being broken away to show the means for mounting the ornamental member on the wheel.

Referring now to Figures 1 and 2 of the drawings, the wheel assembly illustrated includes a wheel 10 having a rim part 11 and a body part 12. The rim 11 is illustrated as being of the usual drop center type having a base flange 13, opposite side flanges 14, opposite intermediate flanges 15, and opposite edge portions 16. The body part 12 is illustrated as having a configuration similar to that recently adopted by many manufacturers to permit the use of a brake drum 17 which extends well beneath the base flange 13 of the rim 11. As will be seen from the drawings, the body part 12 includes a substantially laterally extending flange 18, the outer edge portion 19 of which is adapted to fit below the base flange 13 of the rim 11 and be secured thereto in any suitable manner, such as by welding, riveting or the like. The central portion of the body part 12 includes a circular holding flange 20 which is adapted to be secured by suitable bolts 21 (preferably five) to the axle plate 22 on the front face of the brake drum 17.

Two ornamental members 23 and 24 are shown disposed on the outer side of the wheel 10. The ornamental member 23 is a relatively large dome-shaped member having an underturned outer edge 25. The ornamental member 24 is illustrated as having some suitable configuration which is pleasing to the eye and includes an underturned outer peripheral edge 26 which is adapted to bear against the outer edge portion 16 of the rim 11, and it is also provided with an underturned inner edge portion 27 which is adapted to extend into biting engagement with the outer intermediate flange 15 of the rim 11. As is well known to those skilled in the art, the biting engagement made by the underturned edge 27 with a portion of the rim 11 causes the ornamental member 24 to be tightly and substantially permanently mounted on the wheel.

The novel ornamental member retaining means, which forms one of the cardinal features of the present invention, will now be described.

Secured to the outer face of the body part 12 is a plurality of leaf spring elements 28 formed of some suitable resilient material, such as spring steel. Each element 28 includes a tail portion 29, an intermediate or main portion 30, and an end portion 31. The tail portion 29 is secured to the front face of the body part 12 in any suitable manner, such as by a rivet 32. The intermediate portion 30 of the element 28 extends radially outwardly and slightly rearwardly, as is clearly indicated in the drawings. The outer end portion 31 of each leaf spring element 28 is bent so as to form a substantial angle with the main portion 30 of the element 28 for a reason which will presently be described.

As may be seen in Figure 1, the free end portion 31 of each leaf spring element 28 extends into an aperture 33 located in the laterally extending flange portion 18 of the body part 12 in close proximity to the base flange 13 of the rim 11. When the spring elements 28 are in their normal unstressed position, the main body parts 30 of the elements 28 lie away from the laterally extending flange 18. That is, the elements 28 are free to flex either toward or away from the body part 12 of the wheel 10. As the ornamental member 23 is moved into the desired position on the wheel 10, the elements 28 are flexed radially inwardly toward the flange 18 by reason of the camming action of the underturned edge 25 of the member 23 and the main portion 30 of the element 28. This camming action continues until the high points 34 of the elements 28 snap up into ornamental member retaining position behind the underturned edge 25.

It is to be observed that while the elements 28 are easily flexed by a relative slight force in response to axially inward movement of the member 23, the elements 28 are extremely difficult to flex in response to axially outward movement of the member 23. As the underturned edge 25 starts to move axially outwardly, the only way in which the elements 28 can flex to permit such movement is for the underturned tip portions 31 of the elements 28 to slip rearwardly and radially inwardly. That is to say, outward movement of the member 23 also causes inward flexing of the elements 28, and the force required to effect the flexing is relatively great compared with that required for the outward movement of the member 23, for in this case the free ends of the elements 28 must move in a direction against the direction of the applied force. (It is, of course, to be understood that the term "against" as used herein is not to be limited to mean a direction 180 degrees and only 180 degrees from the direction of the applied force, but on the other hand is used in its broader sense to mean "not having any component in the same direction.")

Figure 3:
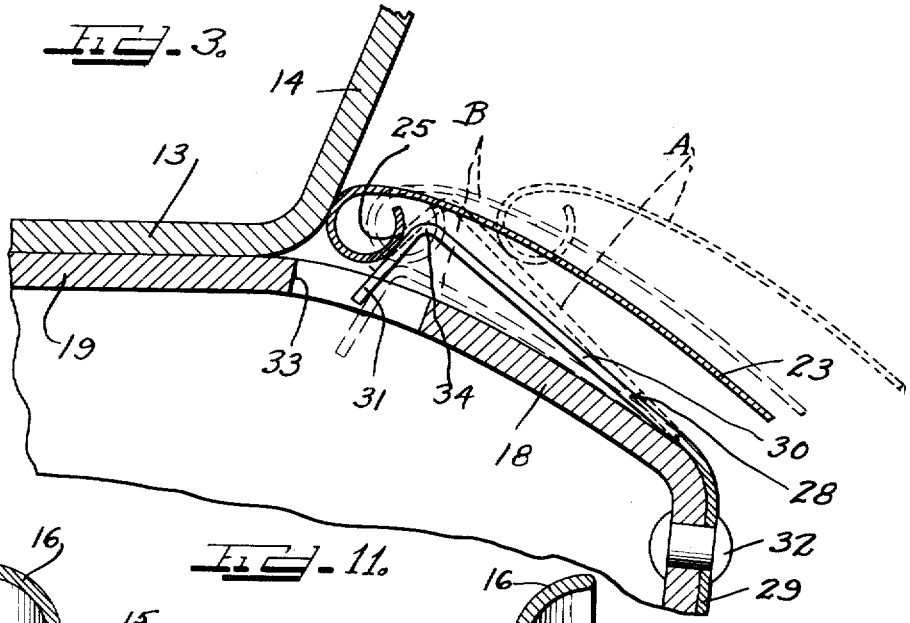
Figure 3 is a greatly enlarged fragmentary view of the novel mounting means of the present invention.

The underlying mechanical principles involved in an "easy-on, hard-off" ornamental member mounting assembly is clearly indicated in Figure 3 of the drawings, as the ornamental member 23 is first brought into engagement with the spring elements 28, the respective elements of the assembly are illustrated by their dotted line position A. As the underturned edge 25 of the ornamental member 23 passes over the hump portion 34 of the spring elements 28, the respective elements of the assembly are in their respective dotted line position as indicated at B. The respective positions of the different elements of the assembly in their final position are indicated by the full lines in Figure 3. It is to be observed that as the ornamental member 23 is moved from right to left in Figure 3, very little force is required to flex the spring elements 28 downwardly, for the reason that their pivot point or point of flexure is well to the right of the point at which the underturned edge 25 of the member 23 first engages the spring elements 28. It is further to be noted that after the ornamental member 23 has once passed over the hump 34 of a spring element 28 so that it is in the position indicated by the full lines in Figure 3, a relatively great force is required to subsequently move the ornamental member from left to right. This is by reason of the fact that the spring element 28 tends to buckle in its middle rather than flex down out of the path of the underturned edge 25, as it did when the member 23 was being mounted on the wheel. Since the point of flexure is ahead of the point at which the underturned edge 25 engages the spring element 28, it is apparent that it will take a relatively large force to cause the bent end 31 of the spring element 28 to move downwardly against the removal force. The amount of force which is necessary to remove the ornamental member 23 from the wheel assembly may be adjusted by varying the angle at which the main body of the spring element 28 extends away from its point of flexure, or by varying the angle at which the tip portion 31 is disposed with respect to the direction of the removal force (that is to say, with respect to the horizontal).

From the above description, it will be apparent that I have provided an extraordinarily simple, yet effective arrangement for detachably securing an ornamental member to a wheel. The novel arrangement permits the ornamental member to be mounted on the wheel by simply moving it axially inwardly against the side of the wheel. It should also be noted that with this particular arrangement, the ornamental member will be self-centered on the wheel. It will also be observed that while only a very slight axial pressure on the outside of the ornamental member is necessary to snap it into retaining engagement with the springs carried on the wheel (in fact, it has been found in practice that an ornamental member of the character described may be mounted by simply pressing on it with one or two fingers), a relatively great force is necessary to dismount the ornamental member from the wheel. One convenient method for dismounting the ornamental member from the wheel is to insert the relatively sharp edge of a pry-off tool between the outer marginal extremity of the ornamental member 23 in the intermediate side flange 14 of the rim 11, and then give the tool a sharp jerk.

Figure 4:
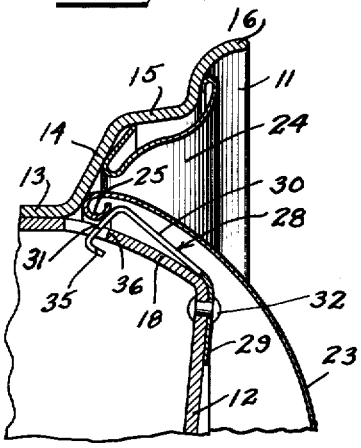
Figure 4 is a fragmentary elevational view, partly in cross section, similar to the upper right hand portion of Figure 1 but showing a slightly modified form of ornamental member retaining means.

In Figure 4 of the drawings, a slightly modified form of spring element is illustrated which requires a slightly greater force to remove the ornamental member from that required for the spring construction just described. In this modified form, the wheel construction and the form of ornamental member are identical to that of the preferred embodiment and therefore have been given the same reference numerals. The leaf spring elements 28, however, have underturned lips 35 at their extreme free ends which are adapted to engage the undersurface 36 of the flange 18. This construction permits the elements 28 to be stressed in their normal position. That is to say, the spring elements 28 may be stressed so that they tend to move outwardly but are refrained from such movement by the lips 35. As will be apparent to those skilled in the art, this stressing of the elements 28 in their normal position increases the amount of deformation force necessary to flex the elements 28 both by the inward movement of the member 23 and the outward movement thereof. That is to say, since the elements 28 flex inwardly not only during their mounting operation but also during dismounting of the ornamental member from the wheel, it is obvious that the stressing of the elements 28 which tends to have them move outwardly, increases the amount of force necessary to flex them inwardly. In this slightly modified arrangement of the preferred embodiment of my invention, the ornamental member is assembled and disassembled in precisely the same way as described in connection with the form shown in Figures 1 to 3 of the drawings.

Figure 5:
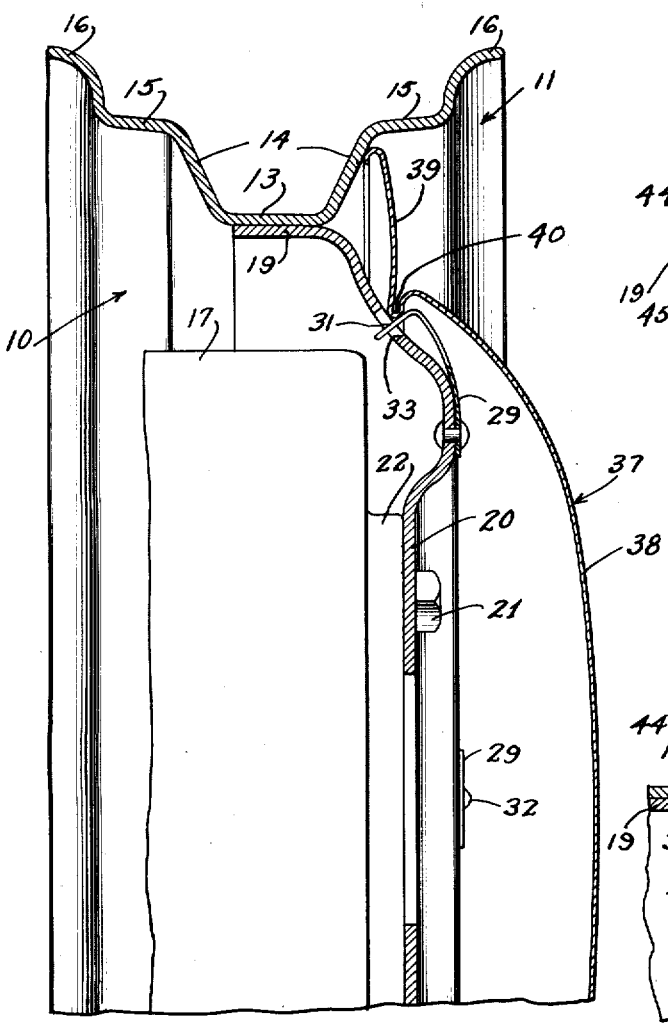
Figure 5 is a side elevational view, partly in cross section, of the upper half of a wheel assembly illustrating an ornamental member of different configuration from that shown in Figure 1 but having substantially the same form of ornamental member retaining means on the wheel.

In Figure 5, spring elements similar to those described in the preferred embodiment of the invention are shown, but they cooperate with a different form of ornamental member. The configuration of the wheel main or body part is also slightly different. Those elements of the wheel assembly which are similar to those previously described will be given the same reference numerals, and no further description thereof will be made.

Referring now to the drawings, a single ornamental member 37 has been substituted for the two ornamental members 23 and 24 shown in Figures 1 and 2. The ornamental member 37 includes a dome portion 38 and an outer integral ring portion 39. An annular intermediate reentrant groove 40 is formed in the member 37 for the dual purpose of providing a radially inwardly extending flange and of providing a suitable groove in which a pry-off tool may be inserted to remove the ornamental member 37 from its mounted position on the wheel 10. As will be observed from the drawings, the intermediate reentrant groove or flange 40 acts in the wheel assembly combination in substantially the same way and for the same purpose as the underturned marginal edge 25 of the preferred embodiment does. The ornamental member 37 is mounted on and dismounted from the wheel 10 in the same manner as the ornamental member 23 is mounted on and dismounted from the wheel illustrated in Figure 1.

Figure 6:
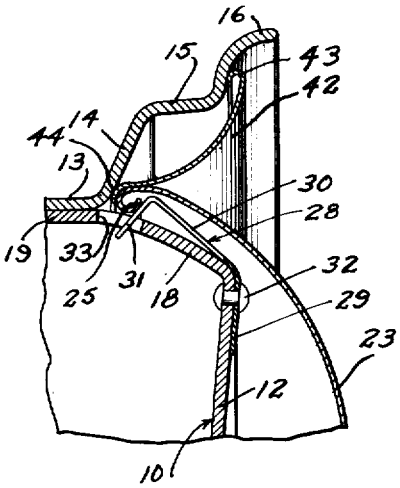
Figure 6 is a fragmentary view, partly in cross section, illustrating a slightly modified form of the embodiment of my invention illustrated in Figure 1.

In Figure 6 of the drawings, an arrangement quite similar to the preferred embodiment of the invention illustrated in Figure 1 of the drawings is shown. Those elements in Figure 6 which are identical with corresponding elements in Figure 1 have been given the same reference numerals for purposes of clarity. In this arrangement, however, the ornamental trim ring 42 is secured in place by means of the same spring elements 28 which secure the ornamental member 23 in place. The trim ring 42 may be given any configuration which is pleasing to the eye, but preferably is of the configuration indicated in the drawings. The outer marginal edge 43 of the trim ring 42 is underturned and adapted for disposition against the outer edge of the portion 16 of the rim 11. The inner marginal edge 44 of the trim ring 42 is outwardly turned and adapted to rest in intimate contact with the curled outer edge 25 of the ornamental member 23.

From the drawings, it will readily be apparent that the spring pressure of the elements 28 which retain the ornamental member 23 in desired position on the wheel also retain the ornamental trim ring 42 in desired position by reason of the fact that the outer turned inner marginal edge 44 of the trim ring 42 lies between the side flange 14 of the rim 11 and the curled outer edge 25 of the ornamental member 23. The ornamental member retaining elements 28 function in the combination in precisely the same manner as that described in connection wtih the preferred embodiment of the invention illustrated in Figures 1 and 2 of the drawings.

To assemble the ornamental trim ring 42 and the ornamental member 23 of the wheel 10, the ornamental trim ring 42 is disposed in desired position against the outer side of the rim 11, and the ornamental member 23 is snapped over the elements 28 against the outer turned inner marginal edge 44 of the ornamental trim ring 42. As the ornamental member 23 is moved into the desired position, the elements 28 snap up behind the underturned edge 25 into retaining engagement therewith. To dismount the ornamental members from the wheel, a much greater force is necessary and hence the members may be conveniently removed by any suitable pry-off tool.

Figure 7:
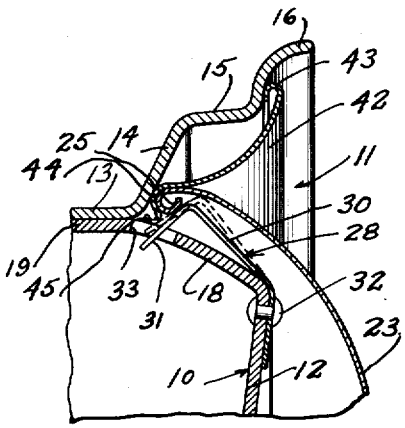
Figure 7 is a view similar to Figure 6 but showing a novel arrangement whereby the trim ring is temporarily held in place during the assembling of the central ornamental member.

In Figure 7, an arrangement somewhat similar to that shown in Figure 6 is illustrated, but in this instance provision is made for temporarily supporting the ornamental trim ring in desired position, pending the assembly of the central ornamental member in position on the wheel. For purposes of clarity, those elements which are substantially the same as corresponding elements in Figure 6 have been given the same reference numerals.

Referring now to the drawings, it will be noted that the outwardly bent inner marginal edge 44 of the trim ring 42 is provided with a reverse curve at its extreme end, as at 45. The reverse curve portion 45 is adapted to engage the end portions 31 of the leaf spring elements 28 prior to the time when the ornamental member 23 is moved into position on the wheel. The cooperation of the spring elements 28 with the reverse curve portion 45 of the trim ring 42 at a time prior to the assembling of the ornamental member 23 on the wheel 10 is clearly indicated by the dotted lines in the drawings. As the ornamental member 23 is moved into the desired position on the wheel 10, the curled outer edge 25 rides over the spring elements 28 as previously described and rests against the curved portion 45 of the trim ring 42. It will be noted that when the ornamental member 23 is in this position, the reverse curved portion 45 of the trim ring 42 does not rest in contact with the end portion 31 of the element 28, this being necessary in order to secure the application of spring pressure through the curved portion 25 and then through the curved portion 45 of the trim ring 42 to the side flange 14 of the rim 11.

In order to carry out the teachings of the present invention, it is not necessary that the vehicle wheel 10 be apertured opposite the free ends 31 of the spring elements 28, for it is only necessary that there be sufficient clearance between the ends 31 of the spring elements 28 and the wheel body to permit the movement illustratd in Figure 3. It is thus apparent that the free ends of the spring elements 28 may be disposed over a suitable groove in the body part of the wheel 10, suitable indentations, or that the entire spring elements be spaced from the main body part of the wheel, such as by mounting them over bulges in the wheel or by mounting them on a separate member or members secured to the wheel.

Figure 8:
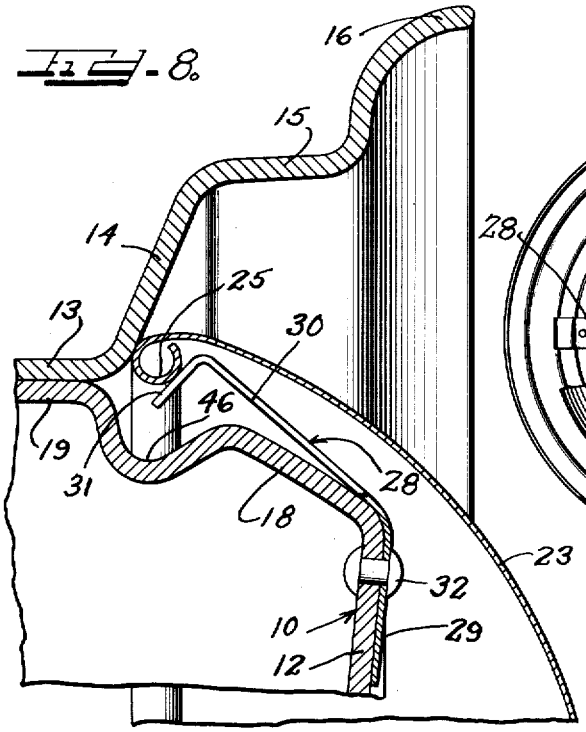
Figure 8 is a fragmentary elevational view illustrating the novel form of ornamental member retaining means, the free end of which is disposed over an annular groove in the body part of the wheel.

In Figure 8 of the drawings, a form of wheel construction is shown which does not require the free ends 31 of the spring elements 28 to extend through apertures in the wheel. More particularly, the laterally extending flange 18 of the wheel body part 12 is provided with an annular groove 46, and the spring element 28 is so mounted on the wheel 10 that the free end 31 is disposed above the groove 46. It will at once be apparent that this groove 46 permits sufficient flexing of the spring elements 28 to permit them to operate in the manner described in connection with Figures 1 to 3 of the drawings.

Although an annular groove 46 has been described above, it will be at once apparent that an annular series of indentations or depressions which are spaced opposite the free ends 31 of the springs 28 will permit the operation of this form of the invention in precisely the same manner as that described in connection with Figure 8, and a wheel with such indentations may be employed with equal success.

Figure 10:
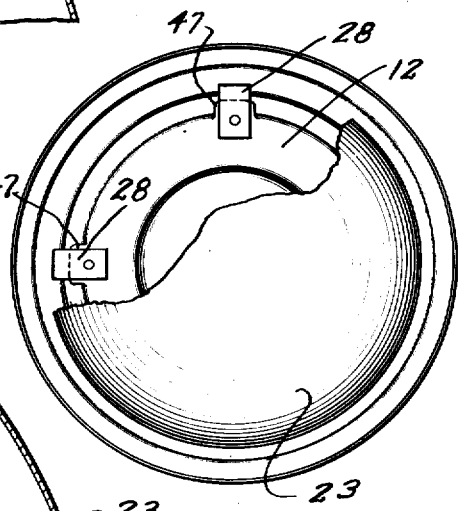
Figure 10 is a front elevational view of a wheel assembly, of which a portion was illustrated in Figure 9.
Figure 9:
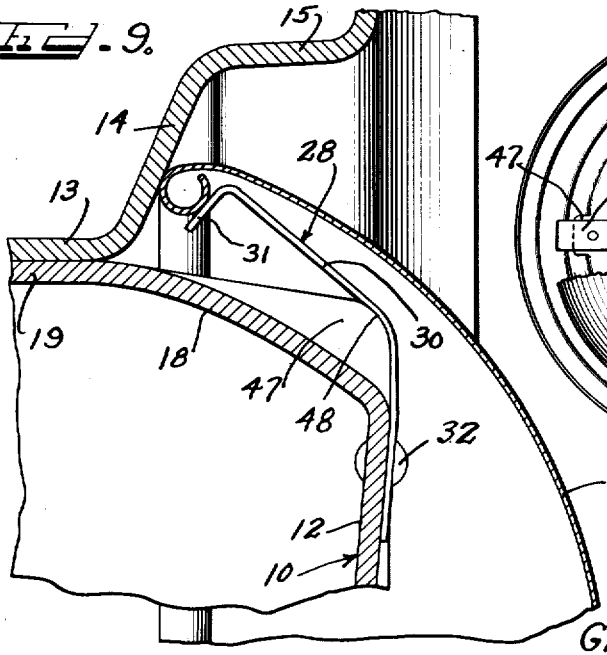
Figure 9 is a fragmentary elevational view illustrating the novel ornamental member retaining means disposed over raised portions on the vehicle wheel.

In Figures 9 and 10, apertures in the laterally extending flange 18 of the wheel body part 12 are rendered unnecessary by virtue of the fact that the laterally extending flange 18 is provided with an annular series of bulges 47 thereon. The spring elements 28 are secured to the wheel body part 12 in the manner described in connection with Figures 1 to 3 of the drawings by means of rivets 32 or the like, but in this case the central portions 30 of the spring elements 28 extend up and over the corner 48 of the bulge 47. It will therefore be observed that the bulges 47 in the laterally extending flange 18 of the wheel body part 12 serve to space the spring elements 28 so that their free ends 31 are spaced a sufficient distance from the upper surface of the laterally extending flange 18 to permit flexing of the spring elements 28 in the manner described and illustrated in connection with Figure 3 of the drawings.

Although an annular series of bulges 47 have been described as providing the means by which the spring elements 28 are spaced from the upper surface of the laterally extending flange 18, it is obvious that a continuous ridge or other abutment may be provided for the purpose of spacing the spring elements 28; or, in fact, the laterally extending flange 18 itself may be so shaped with respect to the shape of the spring elements 28 that the free ends 31 of the latter will be spaced a sufficient distance from the upper surface of the flange.

The manner in which the ornamental member 23 is mounted and dismounted from the wheel 10 in Figures 9 and 10 is precisely the same, and the spring elements 28 operate in precisely the same manner, as that described in connection with the embodiment of the invention illustrated in Figures 1 to 3 of the drawings.

Figure 11:
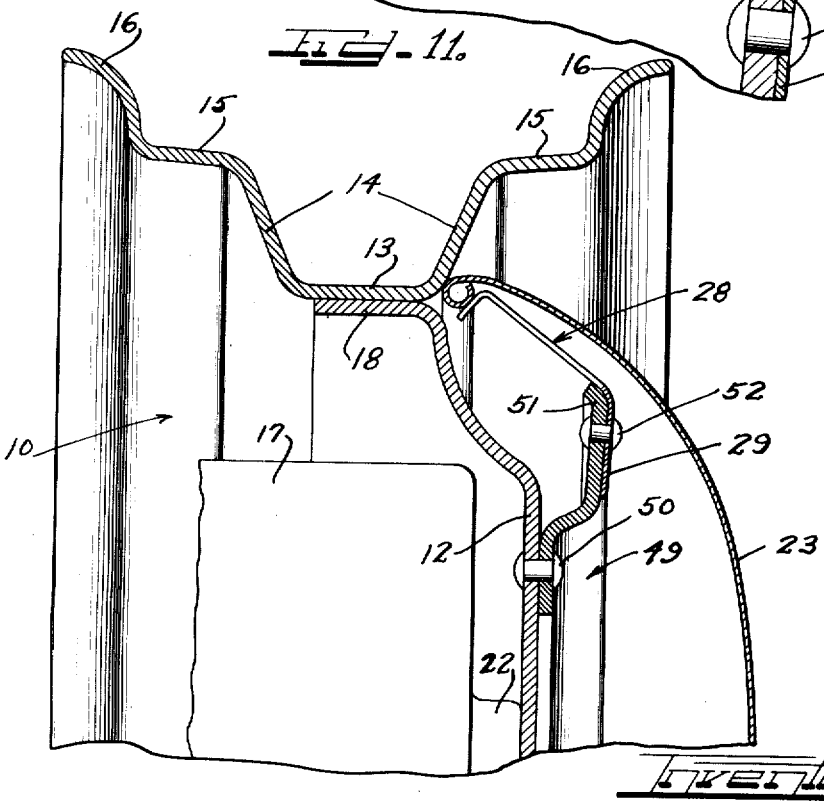
Figure 11 is a fragmentary elevational view illustrating the novel ornamental member retaining means secured to a separate mounting ring mounted on the front face of a wheel.
Figure 12:
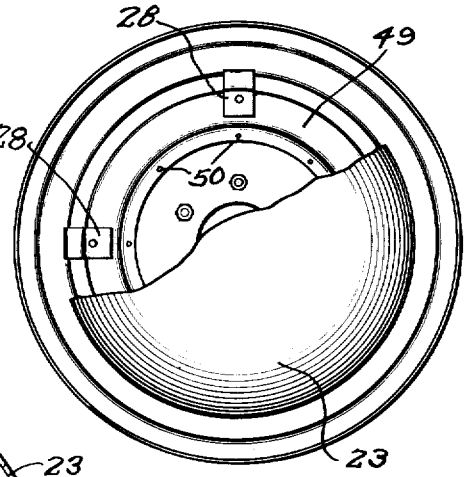
Figure 12 is a front elevational view of a wheel, incorporating the embodiment of my invention illustrated in Figure 11.

In Figures 11 and 12 of the drawings, a further arrangement is shown which renders the need for apertures opposite the free ends of the spring elements 28 unnecessary. In this form of the invention, the wheel body part 12 of the wheel 10 is of slightly different cross-sectional configuration from that previously described, but it will be understood that the precise nature and character of the cross-sectional configuration of the wheel is immaterial to the carrying out of the teachings of the present invention.

As may be seen best in Figure 11, a separate ring member 49 is secured to the body part 12 of the wheel 10 in any suitable manner, such as by means of a plurality of rivets 50. Secured to the outer marginal edge portion 51 of the ring 49 are the spring elements 28. The spring elements 28 may be secured to the ring member 49 in any suitable manner, such as by means of a plurality of rivets 52. It will thus be understood that the ring member 49 serves the function of spacing the spring elements 28 a desired distance away from the outer surface of the body part 12 of the wheel 10, by virtue of the fact that the tail portions 29 of the spring elements 28 are spaced outwardly from the outer surface of the body part 12. The operation of the spring elements 28 in this form of the invention is precisely similar to that described in connection with Figure 3 of the drawings, and the ornamental member 23 may be mounted and dismounted from the wheel 10 in the manner hereinbefore described.

Although a single ring member 49 is described as being secured to the wheel body part 12, upon which the spring elements 28 are mounted, it is to be understood that a plurality of spaced annularly disposed members may be employed with equal success, such, for example, as by providing a separate auxiliary member for each spring element 28.

From the above description, it will be seen that I have provided an extraordinary simple, yet effective method and means for mounting ornamental members on wheels. The novel means includes the highly desirable characteristic which requires only a slight deformation force to assemble the ornamental member or members on the wheel, but which requires a relatively great force to dismount the member or members from the wheel.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. The combination comprising a wheel, an ornamental member for disposition on the outer side of said wheel having an underturned marginal edge, and a plurality of resilient leaf ornamental member retaining elements each secured to said wheel at one end and extending radially outwardly and axially inwardly of their point of attachment to the wheel, each element being bent at its free end to form a cam surface at a substantial angle to the direction of normal extension, said cam surface being adapted to engage said underturned edge to retain said ornamental member in desired position on said wheel.

2. The combination comprising a wheel, a plurality of ornamental members for disposition on the outer side of said wheel including one ornamental member having an underturned outer marginal edge, and a plurality of resilient leaf ornamental member retaining elements each secured to said wheel at one end and extending radially outwardly and axially inwardly of their point of attachment to the wheel, each element being bent at its free end to form a cam surface at a substantial angle to the direction of normal extension, said cam surface being adapted to engage said underturned edge to retain said ornamental members in desired position on said wheel, said ornamental member having said underturned marginal edge being adapted to secure the other of said ornamental members in place.

3. The combination comprising a wheel having rim and body parts, said body part including a substantially laterally extending flange having an annular series of apertures therein, an ornamental member for disposition over said body part and having an underturned outer marginal edge, a plurality of axially inwardly and radially outwardly extending leaf spring elements each secured at its inner end to said body part and each having its outer end bent at a substantial angle to itself and extending into one of said apertures of said lateral flange, said bent portion being adapted to engage said underturned edge of said ornamental member, thereby to detachably retain said member in desired position on said wheel.

4. The combination comprising a wheel having rim and body parts, said body part including a substantially laterally extending flange having an annular series of apertures therein, an ornamental member for disposition over said body part and having an underturned outer marginal edge, a plurality of axially inward and radially outwardly extending leaf spring elements each secured at its inner base to said body part and each having its outer end bent at a substantial angle to itself and extending into one of said apertures of said lateral flange, said bent portion being adapted to engage said underturned edge of said ornamental member, thereby to detachably retain said member in desired position on said wheel, said bent portion of each of said elements being provided at its outer extremity with a lip adapted to engage the underside of said lateral flange to limit outward movement of the free end of said element.

5. The combination comprising a wheel having rim and body parts, an ornamental member adapted to cover a substantial portion of the exterior side of said wheel including the junction point between said rim and body parts, said member having an intermediate annular flange extending radially inwardly, a plurality of leaf spring retaining elements each secured at one end to the outer surface of said wheel and extending radially outwardly and axially inwardly, the free end of said spring element having a cam surface at a substantial angle to the direction of extension of said element adapted to engage the underside of said flange, thereby to detachably retain said ornamental member in desired position on said wheel.

6. The combination comprising a wheel, an ornamental member for disposition on the outer side of said wheel, said member having an indented annular groove portion forming a radially inwardly extending flange, a plurality of leaf spring retaining elements each secured at one end to the outer surface of said wheel and extending radially outwardly and axially inwardly, the free ends of said elements being bent rearwardly and radially inwardly forming a surface adapted to detachably engage said flange, thereby to retain said ornamental member in desired position on said wheel.

7. The combination comprising a wheel, an ornamental trim ring having an axially outwardly facing channel at its inner marginal edge, an ornamental member having a curved outer edge adapted to nest in said curved edge of said ring, and a plurality of resilient leaf ornamental member retaining elements each secured to said wheel at one end and extending radially outwardly and axially inwardly of its point of attachment to the wheel, each element being bent at its free end to form a cam surface at a substantial angle to the direction of normal extension, said cam surface being adapted to engage said curved edge of said member to retain said ornamental member and said trim ring in desired position on said wheel.

8. The combination comprising a wheel, an ornamental trim ring having an axially outwardly facing channel at its inner marginal edge, an ornamental member having a curved outer edge adapted to nest in said curved edge of said ring, and a plurality of resilient leaf ornamental member retaining elements each secured to said wheel at one end and extending radially outwardly and axially inwardly of its point of attachment to the wheel, each element being bent at its free end to form a cam surface at a substantial angle to the direction of normal extension, said cam surface being adapted to engage said curved edge of said trim ring to retain said ring in desired position on said wheel pending the assembling of said ornamental member thereon, said cam surface also being adapted to engage said curved outer edge of said ornamental member to retain said ornamental member and said trim ring in desired position on said wheel.

9. The combination comprising a wheel, a wheel, a dished disc disposed on the outer side of the wheel and having a turned edge on the inside thereof, the wheel having a body with a portion projecting axially outwardly for cooperation with said dished disc, and spring catches for retaining said disc on said wheel, each of said catches comprising a strip of spring metal fixed at one end to said wheel body and having a body part extending diagonally away from the wheel axis and providing an inclined surface engaging the inside of said turned edge, said body part extending generally in an axial direction outwardly from said bent end and thence radially inward to its point of attachment to said wheel body.

10. In a wheel including tire rim and body parts, an annular trim ring associated with the tire rim part, a circular cover member associated with the body part and overlapping the inner marginal portion of said trim ring, and spring clips on said body part and engaging a shoulder on said cover member to clampingly force said cover member against said marginal portion and to hold said cover member and trim ring on the wheel, said spring clips on the body part wedgingly interconnecting and holding said cover member with said ring in concentric relation against the body part.

11. In a wheel including tire rim and body parts, an annular trim ring associated with the tire rim part, a circular cover member associated with the body part and overlapping the inner marginal portion of said trim ring, and spring clips on said body part and engaging a shoulder on said cover member to clampingly force said cover member against said marginal portion and to hold said cover member and trim ring on the wheel, each of said spring clips comprising a body portion and a flexible end portion adapted to yieldably urge said circular member tightly against said marginal portion of the ring and both said member and ring tightly against said wheel rim part, said spring clips on the body part wedgingly interconnecting and holding said cover member with said ring in concentric relation against the body part.

12. In a wheel including tire rim and body parts, an annular trim ring associated with the tire rim part, a circular cover member associated with the body part and overlapping the inner marginal portion of said trim ring, and spring clips on said body part and engaging a shoulder on said cover member to clampingly force said cover member against said marginal portion and to hold said cover member and trim ring on the wheel, said trim ring overlying the side flanges of the rim part and said cover member comprising a hub cap disposed over the body part and overlapping the marginal portion of the trim ring on the outer side of the tire rim part, said spring clips on the body part wedgingly interconnecting and holding said cover member with said ring in concentric relation against the body part.

13. In a wheel including tire rim and body parts, an annular trim ring associated with the tire rim part, a circular cover member associated with the body part and overlapping the inner marginal portion of said trim ring, and spring clips on said body part and engaging a shoulder on said cover member to clampingly force said cover member against said marginal portion and to hold said cover member and trim ring on the wheel, said marginal portion being slightly curved along the outer side of the rim part and said cover member having a curved outer edge nested in the curved marginal portion of the trim ring.

GEORGE ALBERT LYON.